(12) United States Patent
Ueno

(10) Patent No.: US 6,269,941 B1
(45) Date of Patent: Aug. 7, 2001

(54) ROLLER CONVEYOR FOR CONVEYING ELONGATED ARTICLES

(75) Inventor: Ichirou Ueno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/440,914

(22) Filed: Nov. 16, 1999

(30) Foreign Application Priority Data

Nov. 16, 1998 (JP) .................................. 10-325548

(51) Int. Cl.$^7$ .................................................. B65G 13/12
(52) U.S. Cl. ...................... 198/782; 198/788; 198/867.13
(58) Field of Search .................... 198/782, 788, 198/867.13; 193/35 SS, 35 B

(56) References Cited

U.S. PATENT DOCUMENTS

| 2,077,189 | * | 4/1937 | Rishel | 183/35 B |
| 2,216,504 | * | 10/1940 | Sekulski | 193/35 B |
| 2,608,286 | * | 8/1952 | Henschker | 198/782 |
| 3,511,489 | * | 5/1970 | Field | 198/782 |
| 3,690,440 | * | 9/1972 | MacPherson | 198/782 |

\* cited by examiner

*Primary Examiner*—Joseph E. Valenza
(74) *Attorney, Agent, or Firm*—Dann, Dorfman, Herrell and Skillman; Henry H. Skillman

(57) ABSTRACT

A roller conveyor for conveying an elongated article includes a row of drive roller units arranged in a conveyance direction of the elongated articles at intervals smaller than the length of a roller engagement portion of the elongated article. The drive roller units each includes a drive roller for frictionally driving the elongated article in the longitudinal direction thereof while engaging the roller engagement portion of the elongated article, a floating support frame rotatably supporting thereon the drive roller and being attached to a fixed member of the roller conveyor so as to enable an outer peripheral surface of the drive roller to move toward and away from the roller engagement portion of the elongated article, and an urging member for urging the floating support frame in a direction to force the outer peripheral surface of the drive roller against the roller engagement portion of the elongated article. By virtue of the drive roller urged against the roller engagement portion for frictional driving of the elongated article, the roller conveyor is able to convey the elongated article stably and reliably even when the elongated article is distorted during its manufacture or conveyance.

14 Claims, 6 Drawing Sheets

ROLLER CONVEYOR FOR CONVEYING ELONGATED ARTICLES

BACKGROUND OF THE INVENTION

1. Field of the Invention

The present invention relates to a roller conveyor for conveying elongated articles such as skids used, for example, in an automobile painting line.

2. Description of the Related Art

Conventionally, in an equipment or line for painting the bodies of automobiles, in order to prevent mutual collision between the adjacent automobile bodies during conveyance, each automobile body to be painted is placed on a skid having a length larger than the length of the automobile body. The automobile body carried on the skid is then conveyed by a roller conveyor A1 such as shown in FIG. 7.

The roller conveyor A1 includes an elongated rectangular conveyor frame A2 disposed on a floor surface, a number of flanged free rollers A3 disposed on and along one longitudinal edge of the conveyor frame A2, and a number of drive rollers A4 disposed on and along the other longitudinal edge of the conveyor frame A2 at respective positions corresponding to the positions of the flanged free rollers A3.

Each of the flanged free rollers A3 is freely rotatable about a horizontal axis and has a pair of annular flanges F, F at opposite ends of an outer peripheral surfaces thereof. The annular flanges F, F serve to guide opposite side surfaces of an roller engagement portion t which is provided at the bottom of one skid leg A6 of a skid A5 on which a work W is carried. The outer peripheral surface of the flanged free roller A3 supports an undersurface of the roller engagement portion t of the skid A5.

Each of the drive rollers A4 has an outer peripheral surface on which the undersurface of a roller engagement portion t of the other skid leg A6 of the same skid A5 is supported. The drive roller A4 is driven in rotation by the built-in drive motor, so that the skid A5 is conveyed on the roller conveyor A1.

The skid to be conveyed by the roller conveyor is preferably constructed as light as possible so as to improve the conveyance efficiency and the thermal efficiency during conveyance through a drying furnace with a painted automobile body carried on the skid. Additionally, the skid generally has an elongated structure having a length of 5 to 6 meters and a width of about 800 millimeters. Accordingly, the skid of the foregoing construction is likely to be distorted when subjected to a load during conveyance or manufacture thereof.

Due to the distortion of the skid, the roller engagement portion on the skid leg of the skid being conveyed on the roller conveyor may disengage from the outer peripheral surface of the drive roller. Thus, the drive roller fails to transmit a sufficient driving force to the skid, lowering the conveyance efficiency of the roller conveyor.

Particularly in the case of a roller conveyor including a succession of free rollers each disposed between two adjacent ones of the drive rollers, it may occurs that the roller engagement portion of the skid is in contact with one free roller alone while separating from the adjacent drive roller, thereby disenabling further conveyance of the skid.

To cope with this problem, at least one longitudinal edge of the conveyor frame which is adapted to face the corresponding skid leg must be equipped exclusively with the drive rollers. This arrangement, however, requires an increased number of drive rollers, makes the conveyor roller complicated in construction, and increases the manufacturing cost of the conveyor roller.

SUMMARY OF THE INVENTION

It is accordingly an object of the present invention to provide a conveyor roller used for conveyance of an elongated article, which requires only a small number of drive rollers, is relatively simple in construction, and can be manufactured at a low cost.

To accomplish the above-mentioned object, the present invention provides a roller conveyor for conveying an elongated article including a roller engagement portion having a length, the roller conveyor comprising a row of drive roller units arranged in a conveyance direction of the elongated articles at intervals which are smaller than the length of the roller engagement portion of the elongated article. Each of the drive roller units includes a fixed member, a drive roller for frictionally driving the elongated article in the longitudinal direction thereof while engaging the roller engagement portion of the elongated article, a floating support frame rotatably supporting thereon the drive roller and being attached to the fixed member so as to enable an outer peripheral surface of the drive roller to move toward and away from the roller engagement portion of the elongated article, and an urging means for urging the floating support frame in a direction to force the outer peripheral surface of the drive roller against the roller engagement portion.

Preferably, the roller conveyor further includes at least one freely rotatable idler roller disposed between each adjacent pair of the drive roller units for bearing part of a load on the elongated article at a fixed position.

It is also preferable that the roller conveyor further includes a row of freely rotatable idler rollers arranged in parallel with said row of drive roller units for bearing part of a load on the elongated article at a fixed position. At least a part of the idler rollers has an outer peripheral surface formed with a guide portion for guiding the engagement portion of the elongated article to prevent meandering of the elongated article during conveyance.

With this construction, the elongated article, such as a skid, is conveyed as the respective drive rollers of plural drive roller units are rotated while they are in contact with the roller engagement portion of the elongated article.

During conveyance, even when a path of movement of the roller engagement portion is caused to change or fluctuate due to distortion of the elongated article, the floating support frame while being urged by the urging means automatically follows up the change in moving position of the roller engagement portion. Accordingly, the drive roller is always kept in rolling engagement with the roller engagement portion with the result that a frictional driving force of the drive roller is surely transmitted to the elongated article.

In the case where at least one freely rotatable idler roller is provided between each adjacent pair of the drive roller units for bearing part of a load on the elongated article at a fixed position, the load on the elongated article is partially born or supported by the idler roller and thus lessen the load on the drive roller and floating support frame of the drive roller unit.

Furthermore, in the case where the roller conveyor further a row of freely rotatable idler rollers arranged in parallel with said row of drive roller units for bearing part of a load on the elongated article at a fixed position wherein at least a part of the idler rollers has an outer peripheral surface formed with a guide portion for guiding the engagement portion of the elongated article to prevent meandering of the elongated article during conveyance, it becomes possible to reduce the number and size of the drive rollers used and to achieve stable, meandering-free conveyance of the elongate article, such as a skid having a given width, by the use of a reduced number of down-sized drive rollers.

The above and other objects, features and advantages of the present invention will becomes apparent to these versed in the art upon making reference to the following detailed description and accompanying sheets of drawings in which a preferred structural embodiment incorporating the principle of the present invention is shown by way of illustrative example.

DETAILED DESCRIPTION OF THE PREFERRED EMBODIMENT

Figure 1:
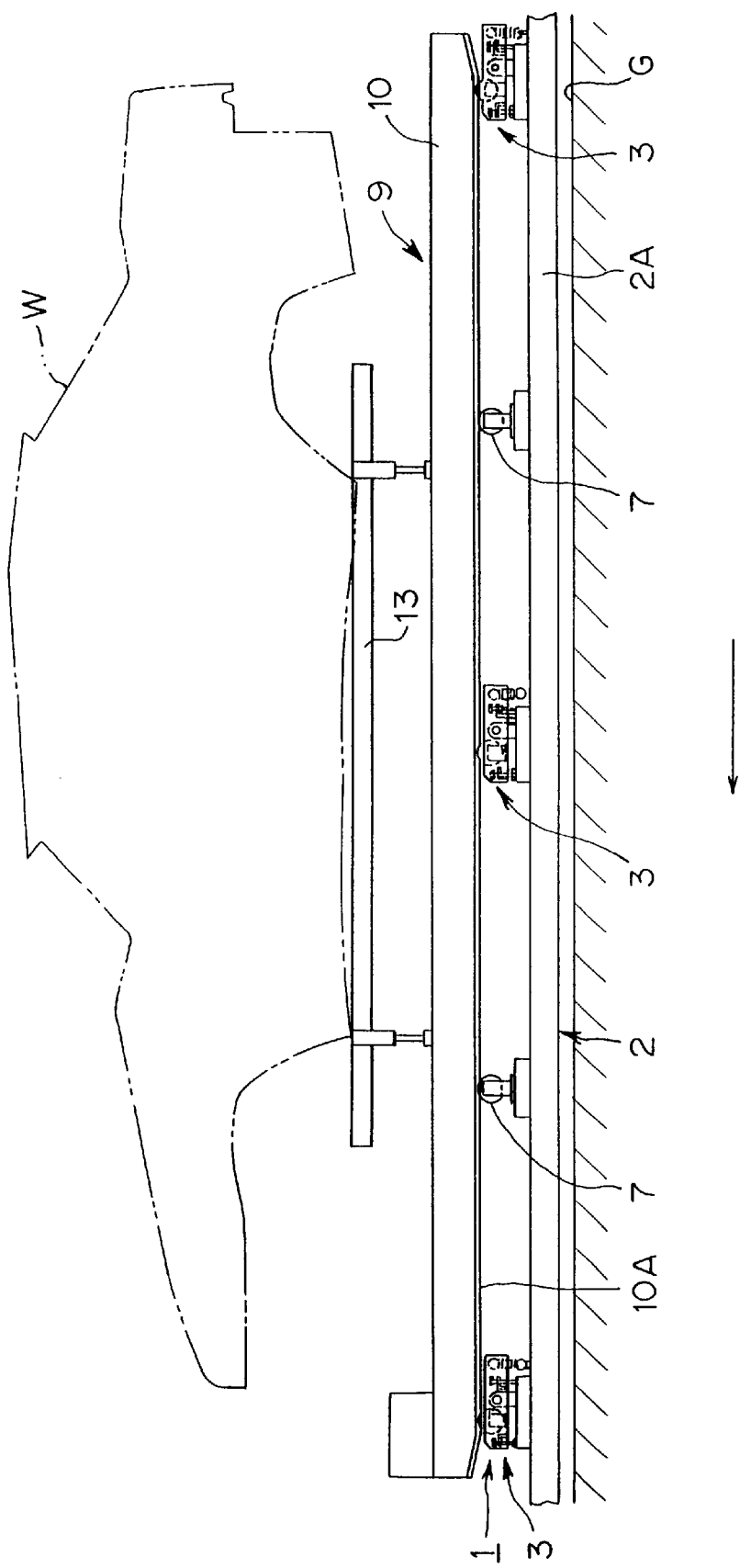
FIG. 1 is a side view of a roller conveyor constructed for conveyance of elongated articles according to one embodiment of the present invention.

A preferred embodiment of the present invention will be described in greater detail with reference to the accompanying sheets of drawings in which like or corresponding parts are designated by the same reference characters throughout the several views.

FIG. 1 shows in side view a roller conveyor designed for conveyance of elongated articles according to the present invention. In the illustrated embodiment, the elongated article is shown as a skid for carrying thereon a work, such as an automobile body.

The roller conveyor 1 includes a conveyor frame 2 fixedly laid on a floor surface G, and a row of drive roller units 3 disposed on the conveyor frame 2 at predetermined intervals in a direction of conveyance indicated by the arrow shown in FIG. 1.

Figure 2:
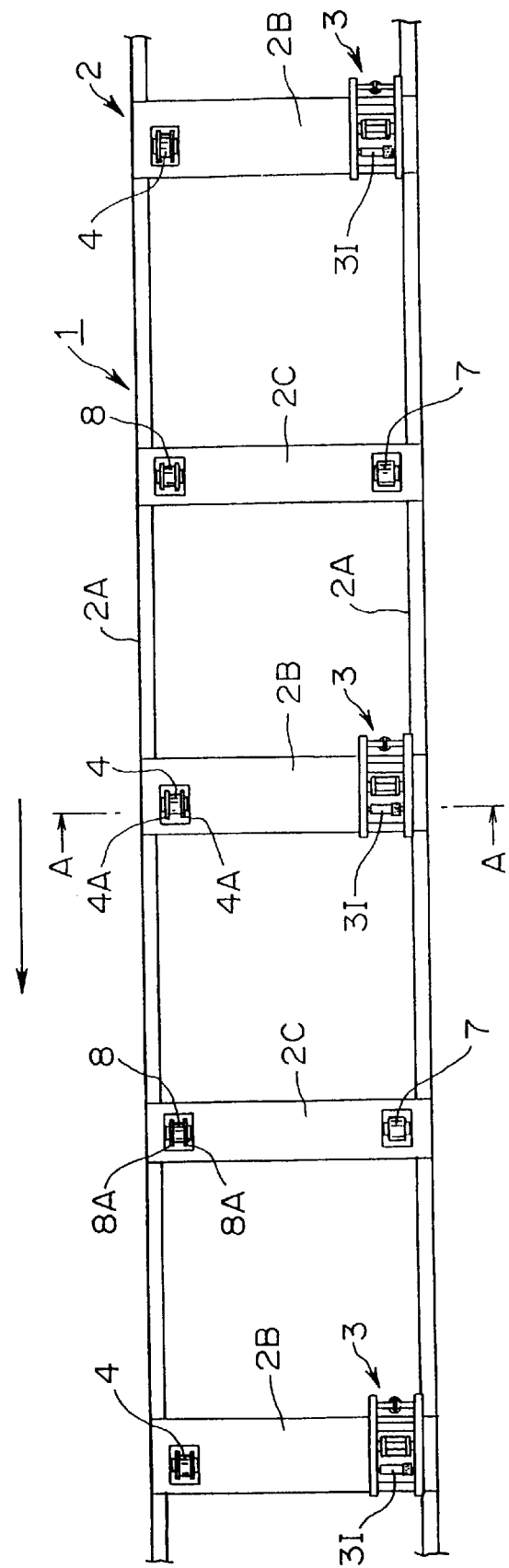
FIG. 2 is a plan view of the roller conveyor.
Figure 3A:
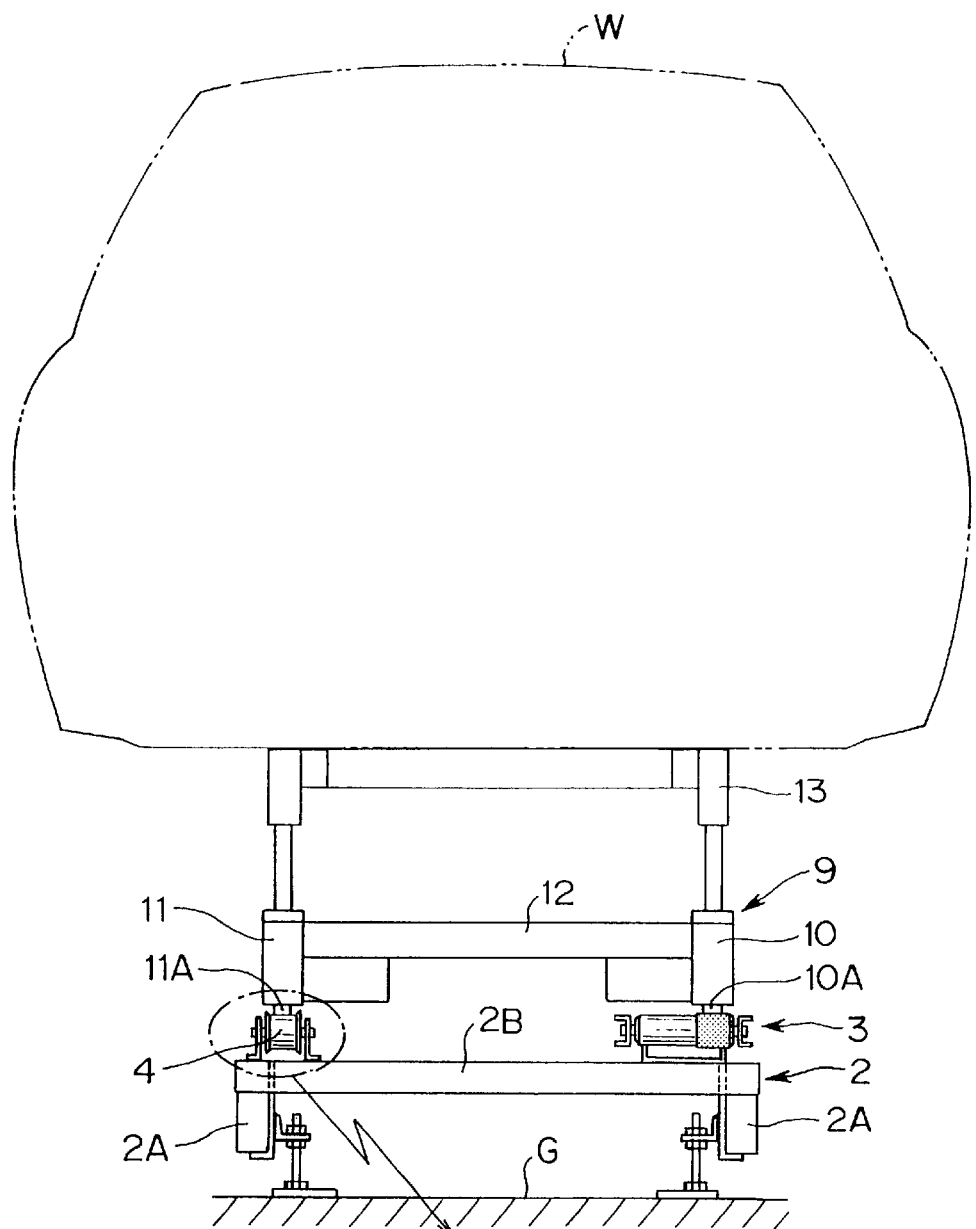
FIG. 3A is a cross-sectional view taken along the line A—A of FIG. 2.
Figure 4:
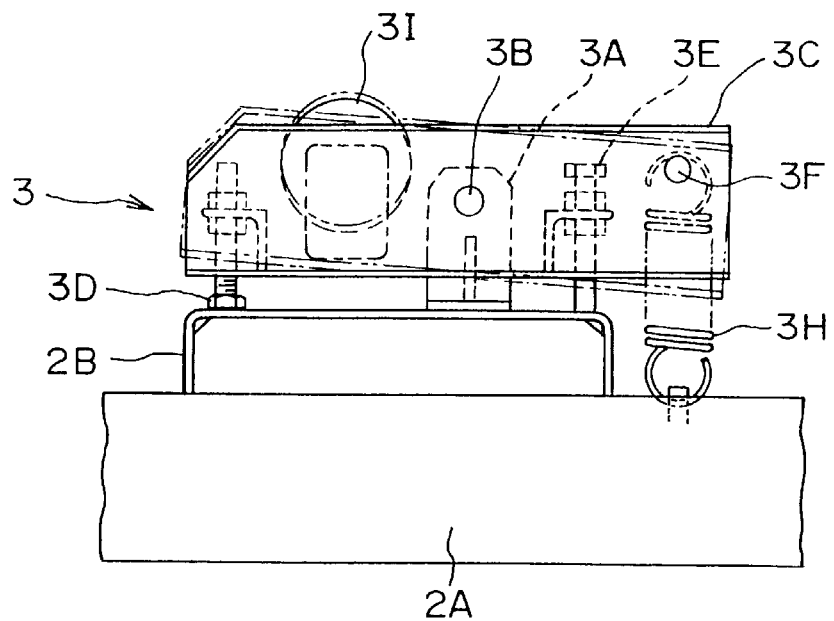
FIG. 4 is a side view of a drive roller unit of the roller conveyor.
Figure 5:
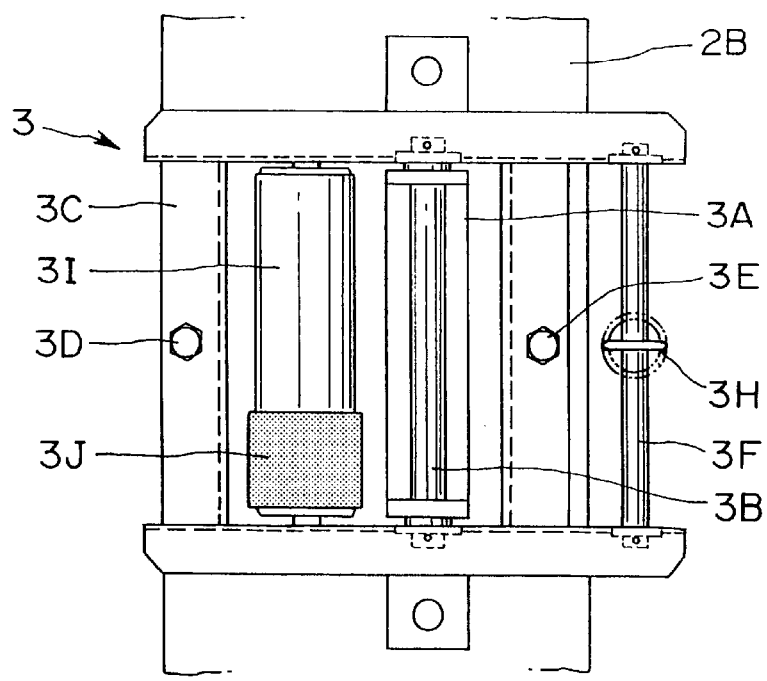
FIG. 5 is a plan view of the drive roller unit.
Figure 6:
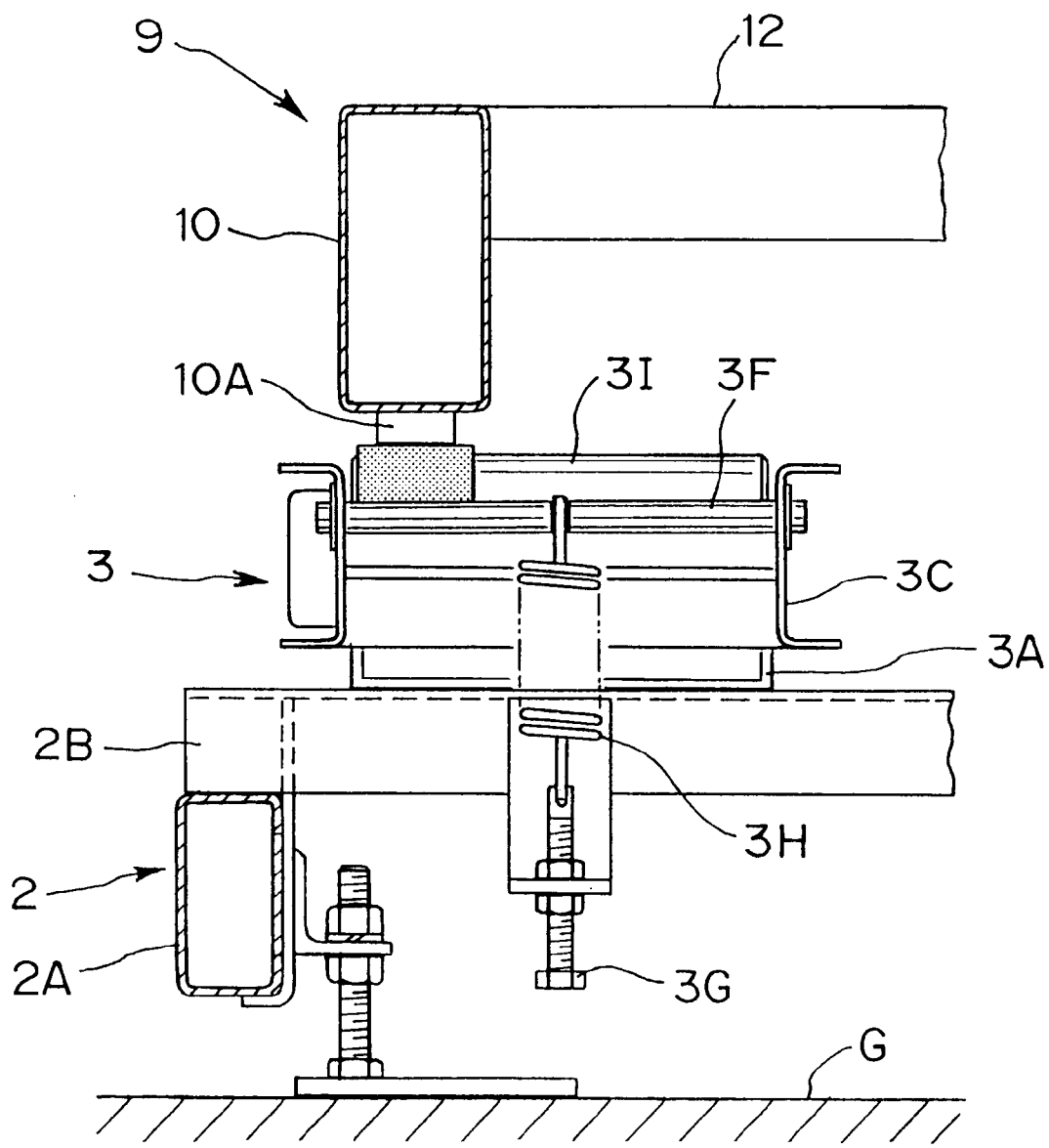
FIG. 6 is an end view of the drive roller unit when viewed from the conveyance direction of the roller conveyor.
Figure 7:
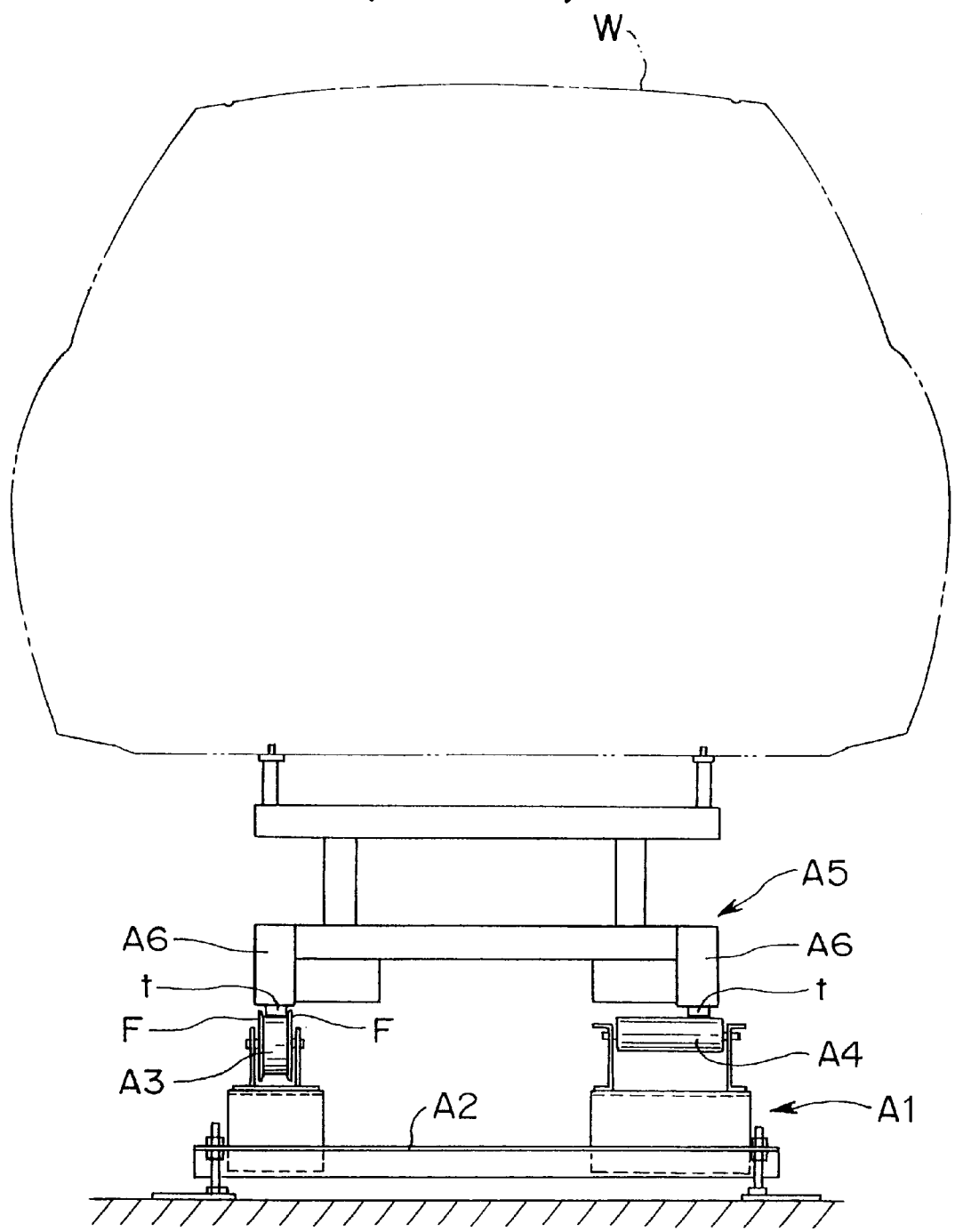
FIG. 7 is a view similar to FIG. 3, but showing a conventional roller conveyor for use in the conveyance of elongated articles.

As shown in FIGS. 2 and 3A, the conveyor frame 2 includes a pair of left and right longitudinal members 2A, 2A and a plurality of cross members 2B interconnecting the left and right longitudinal members 2A in parallel spaced relation. The drive roller units 3 are disposed on the cross members 2B adjacent one end thereof. Each of the drive roller units 3, as shown in FIGS. 4–6, includes a floating support frame 3C pivotally mounted by a horizontal pivot shaft 3B to an upright mounting bracket 3A firmly secured to an upper surface the associated cross member 2B.

Thus, the floating support frame 3C is pivotally movable in a vertical plane. The range of pivotal movement of the floating support frame 3C is adjustably determined by two stopper bolts 3D and 3E which are provided on front and rear sides of the pivot shaft 3B when viewed from the conveyance direction. The drive roller unit 3 also includes a tension coil spring 3H connected at one end to a horizontal retainer pin 3F attached to a rear end portion of the floating support frame 3C and, at the other end, to the top (upper end) of a vertical retainer bolt 3G (FIG. 6) attached to a portion of the associated cross member 2B. By the tension coil spring 3H thus arranged, the floating support frame 3C is normally urged to turn about the horizontal pivot shaft 3B in the clockwise direction shown in FIG. 4 so that in the no-load condition, the top (lower end) of the stopper bolt 3E (FIG. 4) is held in abutment with the upper surface of the cross member 2B. Thus, the tension coil spring 3H forms an urging means.

The floating support frame 3C further has a drive roller 3I rotatably mounted thereon at a position located forward of the pivot shaft 3B. The drive roller 3I contains within it a motor and a reduction mechanism (nether shown) and is so constructed as to be driven in rotation about a fixed horizontal hollow shaft (not shown but attached at opposite ends to the floating support frame 3C) by means of the built-in motor.

The built-in motor of the drive roller 3I receives electric power supplied via a power supply cable (not shown) connected at one end to the motor and drawn to the outside of the drive roller 3I through an internal space of the hollow shaft. As shown in FIG. 5, the outer peripheral surface of the drive roller 3I is coated with an elastic layer 3J along an end portion of the drive roller 3I. The elastic layer 3J is made of a high friction material such as rubber.

Figure 3B:
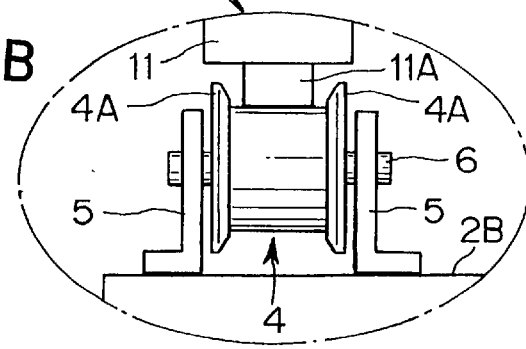
FIG. 3B is an enlarged view of a portion of FIG. 3A.

At the opposite end of each of the cross member 2B, there is provided a freely rotatable idler roller 4, as shown in FIG. 2. As better shown in FIG. 3B, the idler roller 4 has a pair of annular guide flanges 4A, 4A at opposite ends of an outer peripheral surface thereof.

The idler roller 4 is rotatably mounted on a fixed horizontal shaft 6 via a bearing (not shown). The shaft 6 is connected at opposite ends to a pair of roller support brackets 5 attached to the upper surface of the cross member 2B.

Referring back to FIG. 2, the conveyor frame 2 further includes a succession of second cross members 2C each disposed centrally between two adjacent ones of the cross members 2B. Each of the second cross members 2C rotatably supports on its opposite end portions a pair of freely rotatable second idler rollers 7 and 8. When viewed from the conveyance direction, the second idler rollers 7 and 8 are in alignment with the elastic layers 3J of the drive rollers 3I and the idler rollers 4, respectively.

Though not shown in detail, each of the second idler rollers 7, 8 is rotatably mounted on a horizontal shaft fixed at opposite ends to a pair of roller support brackets in the same manner as the idler roller 4. The second idler roller 7 has a smooth outer peripheral surface free of flanges, while the second idler roller 8 has an outer peripheral surface formed with annular flanges at opposite ends thereof. Thus, the second idler roller 8 has the same construction as the idler roller 4.

The elongated article or skid 9, as shown in FIG. 3A, includes a pair of parallel spaced left and right skid legs 10, 11 elongated in the conveyance direction as shown in FIG. 1. The skid legs 10, 11 are connected together by a plurality of crossbars 12 (one being shown in FIG. 3A) spaced at intervals in the longitudinal direction of the skid legs 10, 11.

The skid 9 supports thereon a work retaining frame 13 (FIG. 1) attached to selected ones of the crossbars 12. A work W is placed on the work retaining frame 13.

The skid 9 has a pair of roller engagement portions 10A, 11A provided on the respective undersurfaces of the skid legs 10, 11. While the skid 9 is conveyed on the roller conveyor 1, the respective undersurfaces of the roller engagement portions 10A, 11A are supported on the respective outer peripheral surfaces of the idler rollers 4, 7 and 8, and at the same time, opposite side surface of the roller engagement portion 11A is guided by and between the respective pairs of flanges 4A, 8A of the idler rollers 4 and 8.

Position of the drive rollers 3I is determined such that in the no-load condition, an outside surface of the elastic layer 3J of each drive roller 3I projects upwards from the common level of the outer peripheral surfaces of the idle rollers 4, 7, 8 by about 5 mm.

When the skid 9 is carried on the idler rollers 4, 7, 8, the outside surface of the elastic layer 3J of the drive roller 3I is urged against the undersurface of the roller engagement portion 10A by the force of the tension coil spring 3H.

In this condition, the drive roller 3I is driven in rotation whereupon the skid 9 is forcibly moved in the conveyance direction by a frictional force acting between the outside surface of the elastic layer 3J and the roller engagement portion 10A.

To make sure that the skid 9 is continuously conveyed along the conveyance direction of the roller conveyor 1, the spacing between the adjacent drive roller units 3 is set to be smaller than the length of the roller engagement portion 10A of the skid 9 so that the roller engagement portion 10A can be smoothly transferred from the drive roller 3I of each drive roller unit 3 to the drive roller 3I of the next drive roller unit 3 on the forward side of the conveyance direction.

All of the drive rollers 3I may be continuously drive until the conveyance of a single batch of skids completes. As an alternative, the drive rollers 3I may be driven only through a time period during which the presence of one skid 9 above each drive roller 3I is detected by a suitable sensor, such as a photoelectric sensor which is associated with the drive roller 3I.

Although in the embodiment described above, the urging means associated with the floating support frame 3C is formed by a tension coil spring 3I, the present invention should by no means be limited to the illustrated embodiment. As an alternative, the urging means may include a weight (not shown) attached to the floating support frame so as to produce a moment of force about the horizontal pivot shaft 3B, or an air cylinder (not shown) continuously supplied with working air of constant pressure.

The floating support frame 3C in the illustrated embodiment, which is pivotally movable about the horizontal pivot shaft 3B, may be replaced with a linear guide mechanism (not shown) which is constructed to support the drive roller 3I on the fixed member (conveyor frame 2) in such a manner that the drive roller 3I is linearly movable toward and away from the roller engagement portion 11A. In this instance, a compression spring may be used as the urging means for urging the drive roller 3I against the roller engagement portion 11A.

Since the drive motor and the reduction mechanism are built in the drive roller 3I, the drive roller 3 is simple in construction and compact in size. The drive motor and the reduction gear may be mounted on the floating support frame 3C so that the drive roller 3I is driven by an external drive source.

Although in the illustrated embodiment, one idler roller 7 is disposed between each adjacent pair of drive roller units 3, two or more of such idler roller may be employed provided that the spacing or pitch between the adjacent drive roller units 3 is smaller than the length of the roller engagement portion 11A.

Additionally, the idler rollers 7 disposed between the adjacent drive roller units 3 may be omitted. Furthermore, the drive roller units 3 may be arranged in two or more rows along the conveyance direction.

In the illustrated embodiment, the skid legs 10, 11 and the roller engagement portions 10A, 11A are constructed as two structurally independent members. As an alternative, each of the roller engagement portions 10A, 11A may be constructed jointly by the undersurface and opposite side surfaces of a corresponding one of the skid legs 10, 11. In this instance, the idler rollers 4, 7, 8 preferably have a length properly dimensioned with respect to the width of the roller engagement portions.

Although only one preferred embodiment of the present invention has been disclosed and described with respect to the conveyance of elongated articles in the form of skids, the elongated articles should by no means be limited to the skids but may include any other article provided that a roller engagement portion is provided for engagement with the drive rollers and the idler rollers.

In the case where the elongated articles to be conveyed have a rectangular cross-sectional shape, an arrangement may be employed in which an idler roller supports thereon a roller engagement portion formed on the undersurface of the elongated article, and a drive roller is forced against another roller engagement portion formed on a side surface of the elongated article to thereby frictionally drive the elongated article.

In the illustrated embodiment, the idler rollers 4, 8 each having annular guide flanges 4A, 8A at opposite ends thereof are used as a guide portion for preventing meandering of the skid being conveyed. The annular guide flanges 4A, 8A may be replaced with a circumferential guide ridge of triangular cross section (not shown) formed on the outer peripheral surface at a longitudinal central portion of each idler roller. In this case, in combination with the guide ridge, a V-shaped guide groove (not shown) formed in the undersurface of a roller engagement portion of each elongated article is preferably used. By virtue of fitting engagement between the guide ride and the guide groove, the elongated article while being conveyed is stably guided against meandering.

As described above, according to the present invention, a row of drive roller units arranged in the conveyance direction of elongated articles have respective drive rollers each supported on one floating support frame which is urged by an urging means in such a manner that the drive roller is driven while being urged against a roller engagement portion of each elongated article. Accordingly, even when the elongated article is distorted or otherwise flexed during its manufacture or conveyance, the drive roller is able to follow up the distorted configuration of the elongated article and thus secures positive transmission of a driving force of the drive roller to the elongated article. This arrangement provides an improved conveyance efficiency and a reduced number of drive rollers. As a consequence, the manufacturing cost of the roller conveyor is considerably reduced.

Additionally, since the idler rollers each disposed between two adjacent ones of the drive rollers partly bear a load on the elongated article, it becomes possible to use the drive rollers exclusively for the purpose of frictionally driving the elongated article. Since the load acting on the drive rollers and the drive roller units is reduced, the number of necessary drive roller units can be further reduced, and a motor having a smaller capacity can be used for driving the drive rollers with reduced power consumption.

Furthermore, by virtue of the guide portion formed on the peripheral surface of an idler roller, it becomes possible to reduce the number and size of the drive rollers used and to achieve stable, meandering-free conveyance of skids or the like elongate articles having a given width.

Obviously, various minor changes and modifications of the present invention are possible in the light of the above teaching. It is therefor to be understood that within the scope of the appended claims the present invention may be practiced otherwise than as specifically described.

What is claimed is:

1. A roller conveyor for conveying an elongated article including first and second roller engagement portions having lengths comprising:
   a row of drive roller units arranged in a conveyance direction of the elongated article at intervals which are smaller than the length of the first roller engagement portion of the elongated article, each of said drive roller units including
     a fixed member,
     a drive roller for frictionally driving the elongated article in the longitudinal direction thereof while engaging the first roller engagement portion of the elongated article,
     a floating support frame rotatably supporting thereon said drive roller and being attached to said fixed member so as to enable an outer peripheral surface of said drive roller to move toward and away from the first roller engagement portion of the elongated article, and
     an urging means for urging said floating support frame in a direction to force said outer peripheral surface of said drive roller against the first roller engagement portion;
   said conveyor further including a row of freely rotatable first idler rollers arranged in parallel with said row of drive roller units for bearing part of a load on the elongated article at a fixed position, at least a part of said first idler rollers having an outer peripheral surface formed with a guide portion for guiding the second engagement portion of the elongated article to prevent meandering of the elongated article during conveyance.

2. A roller conveyor according to claim 1, wherein said guide portion includes a pair of annular flanges formed at opposite ends of the outer peripheral surface of said part of the first idler rollers for receiving and guiding the second roller engagement portion of the elongated article.

3. A roller conveyor according to claim 1, wherein said drive roller has an elastic layer of high friction material coated on the outer peripheral surface thereof for frictional engagement with the first roller engagement portion of the elongated article.

4. A roller conveyor according to claim 3, wherein said elastic layer of said drive roller has an outside surface normally projecting slightly upward from a level of an outer peripheral surface of said first idler roller.

5. A roller conveyor according to claim 1, wherein said floating support frame is pivotally mounted by a horizontal pivot pin to said fixed member, said drive roller supported on said floating support frame is located on one of opposite sides of said pivot shaft, and said urging means acts on a portion of said floating support frame located on the other side of said pivot shaft.

6. A roller conveyor according to claim 5, wherein said floating support frame has two stopper bolts disposed on the opposite sides of said pivot shaft and engageable with said fixed member to define a range of pivotal movement of said floating support frame.

7. A roller conveyor according to claim 5, wherein said urging means comprises a tension coil spring connected at one end to said portion of said floating support frame and at the other end to said fixed member.

8. A roller conveyor according to claim 1, further including at least one freely rotatable second idler roller disposed between each adjacent pair of said drive roller units for bearing part of a load on the elongated article at a fixed position.

9. A roller conveyor according to claim 8, wherein said drive roller has an elastic layer of high friction material coated on the outer peripheral surface thereof for frictional engagement with the roller engagement portion of the elongated article, and said elastic layer of said drive roller and said second idler roller are aligned with each other in the conveyance direction of the elongated article.

10. A roller conveyor according to claim 9, wherein said elastic layer of said drive roller has an outside surface normally projecting slightly upward from a common level of respective outer peripheral surfaces of said first and second idler rollers.

11. A roller conveyor according to claim 8, further including at least one freely rotatable third idler roller disposed between each adjacent pair of said first idler rollers for bearing part of a load on the elongated article at a fixed position.

12. A roller conveyor according to claim 11, wherein said drive roller has an elastic layer of high friction material coated on the outer peripheral surface thereof for frictional engagement with the first roller engagement portion of the elongated article, and said second idler roller and said third idler roller are aligned with said elastic layer of said drive roller and the first idler rollers, respectively, in the conveyance direction of the elongated article.

13. A roller conveyor according to claim 12, wherein said third idler roller has an outer peripheral surface formed with a guide portion for guiding the second engagement portion of the elongated article to prevent meandering of the elongated article during conveyance.

14. A roller conveyor according to claim 11, wherein said elastic layer of said drive roller has an outside surface normally projecting slightly upward from a common level of respective outer peripheral surfaces of said first, second and third idler rollers.

* * * * *